(12) United States Patent  
Ito

(10) Patent No.: US 11,204,519 B2  
(45) Date of Patent: Dec. 21, 2021

(54) LIQUID CRYSTAL APPARATUS AND ELECTRONIC DEVICE

(71) Applicant: SEIKO EPSON CORPORATION, Tokyo (JP)

(72) Inventor: Satoshi Ito, Eniwa (JP)

(73) Assignee: SEIKO EPSON CORPORATION, Tokyo (JP)

( * ) Notice: Subject to any disclaimer, the term of this patent is extended or adjusted under 35 U.S.C. 154(b) by 0 days.

(21) Appl. No.: 17/116,293

(22) Filed: Dec. 9, 2020

(65) Prior Publication Data

US 2021/0103185 A1   Apr. 8, 2021

Related U.S. Application Data

(63) Continuation of application No. 16/668,042, filed on Oct. 30, 2019, now Pat. No. 10,890,799.

(30) Foreign Application Priority Data

Oct. 30, 2018   (JP) .............................. JP2018-203690

(51) Int. Cl.
*G02F 1/1335* (2006.01)
*G02F 1/1368* (2006.01)
(Continued)

(52) U.S. Cl.
CPC ...... *G02F 1/133526* (2013.01); *G02F 1/1368* (2013.01); *G02F 1/134309* (2013.01);
(Continued)

(58) Field of Classification Search
CPC ................................................. G02F 1/133526
See application file for complete search history.

(56) References Cited

U.S. PATENT DOCUMENTS

2011/0013102 A1\* 1/2011 Miyazaki ............. H04N 9/3105
349/5
2015/0041833 A1\* 2/2015 Nimura ............. H01L 29/78633
257/88
(Continued)

FOREIGN PATENT DOCUMENTS

JP      2011-158556 A     8/2011
JP      2011158556   *    8/2011 ........... G02F 1/1335
(Continued)

OTHER PUBLICATIONS

Jun. 1, 2020 Office Action Issued in U.S. Appl. No. 16/668,042.
(Continued)

*Primary Examiner* — Sang V Nguyen
(74) *Attorney, Agent, or Firm* — Oliff PLC

(57) ABSTRACT

A liquid crystal apparatus includes an element substrate provided with a pixel electrode and a TFT, and a counter substrate disposed facing the element substrate. The element substrate includes a first microlens, a second microlens, and a third microlens corresponding to the pixel electrode. The first microlens is disposed further toward an incident side of light than the second microlens. A relationship between a lens power of the first microlens and a lens power of the second microlens is that the lens power of the first microlens is greater than or equal to the lens power of the second microlens.

7 Claims, 5 Drawing Sheets

(51) Int. Cl.
*G02F 1/1343* (2006.01)
*G03B 21/00* (2006.01)
*G03B 33/12* (2006.01)
*G02F 1/1362* (2006.01)

(52) U.S. Cl.
CPC ...... *G03B 21/006* (2013.01); *G02F 1/136209* (2013.01); *G02F 2201/123* (2013.01); *G03B 33/12* (2013.01)

(56) References Cited

U.S. PATENT DOCUMENTS

| 2015/0355502 | A1 | 12/2015 | Ozawa |
| 2017/0176812 | A1 | 6/2017 | Ozawa |
| 2018/0173048 | A1 | 6/2018 | Ito et al. |
| 2019/0064584 | A1 | 2/2019 | Ito |

FOREIGN PATENT DOCUMENTS

| JP | 2014-146042 A | 8/2014 |
| JP | 2015-022100 A | 2/2015 |
| JP | 2015-034860 A | 2/2015 |
| JP | 2015-228040 A | 12/2015 |
| JP | 2015-230427 A | 12/2015 |
| JP | 2018-100994 A | 6/2018 |
| JP | 2019-040153 A | 3/2019 |

OTHER PUBLICATIONS

Sep. 9, 2020 Notice of Allowance Issued in U.S. Appl. No. 16/668,042.

Oct. 21, 2020 Corrected Notice of Allowability issued in U.S. Appl. No. 16/668,042.

\* cited by examiner

LIQUID CRYSTAL APPARATUS AND ELECTRONIC DEVICE

This application is a continuation of U.S. application Ser. No. 16/668,042 filed Oct. 30, 2019, which claims priority from JP Application Serial Number 2018-203690, filed Oct. 30, 2018.

BACKGROUND

1. Technical Field

The present disclosure relates to liquid crystal apparatus device and an electronic device.

2. Related Art

As a liquid crystal apparatus, there is known a transmissive liquid crystal apparatus applied to a light valve of a projector. In such a liquid crystal apparatus, to facilitate effective utilization of light emitted from a light source and achieve a bright display, a configuration in which one microlens is provided to an element substrate and one microlens is provided to a counter substrate has been proposed.

However, when the element substrate and the counter substrate are bonded, the problem arises that a center of the micro lens of the element substrate and a center of the micro lens of the counter substrate deviate from each other, resulting in a reduction in brightness. Therefore, in JP-A-2015-228040, there is proposed a liquid crystal apparatus having a configuration in which two microlenses are provided to an element substrate and light is incident from the element substrate side.

Nevertheless, with future advances in high definition, the problem arises that further improvements in light utilization efficiency and improvements in a contrast ratio are demanded in a liquid crystal apparatus in which light is incident from the element substrate side.

SUMMARY

A liquid crystal apparatus according to the present application is a liquid crystal apparatus including a first substrate, a second substrate disposed facing the first substrate, and a liquid crystal layer disposed between the first substrate and the second substrate. The first substrate includes a pixel electrode disposed in the first substrate, a switching element disposed between the first substrate and the pixel electrode, a first microlens disposed between the first substrate and the switching element, and a second microlens disposed between the first microlens and the switching element. The first microlens is disposed further toward an incident side of light than the second microlens. A relationship between a lens power of the first microlens and a lens power of the second microlens is that the lens power of the first microlens is greater than or equal to the lens power of the second microlens.

In the liquid crystal apparatus described above, the first microlens and the second microlens may be convex lenses protruding toward the incident side of the light.

A liquid crystal apparatus according to the present application is a liquid crystal apparatus including a first substrate, a second substrate disposed facing the first substrate, and a liquid crystal layer disposed between the first substrate and the second substrate. The first substrate includes a pixel electrode disposed in the first substrate, a switching element disposed between the first substrate and the pixel electrode, a first microlens disposed between the first substrate and the switching element, a second microlens disposed between the first microlens and the switching element, and a third microlens disposed between the switching element and the pixel electrode.

In the liquid crystal apparatus described above, the first substrate may be disposed further toward an incident side of light than the second substrate, and the first microlens, the second microlens, and the third microlens may be convex lenses protruding toward the incident side of the light.

A liquid crystal apparatus according to the present application is a liquid crystal apparatus including a first substrate, a second substrate disposed facing the first substrate, and a liquid crystal layer disposed between the first substrate and the second substrate. The first substrate includes a pixel electrode disposed in the first substrate, a switching element disposed between the first substrate and the pixel electrode, a first microlens disposed between the first substrate and the switching element, a second microlens disposed between the first microlens and the switching element, and a third microlens disposed between the switching element and the pixel electrode. The first substrate is disposed further toward an incident side of light than the second substrate, and a relationship between a lens power of the first microlens, a lens power of the second microlens, and a lens power of the third microlens is that the lens power of the first microlens is greater than or equal to the lens power of the second microlens, and the lens power of the second microlens is greater than or equal to the lens power of the third microlens.

In the liquid crystal apparatus described above, the first microlens, the second microlens, and the third microlens may be convex lenses protruding toward the incident side of the light.

An electronic device according to the present application includes the liquid crystal apparatus described above.

DESCRIPTION OF EXEMPLARY EMBODIMENTS

With reference to the drawings, description is given below of exemplary embodiments of the present disclosure. The drawings used are appropriately scaled up or down or otherwise exaggerated to allow parts to be described in a fully recognizable manner. Other components than components needed to be described may sometimes be omitted.

Note that, in the exemplary embodiments below, the description "on the substrate", for example, indicates that the component is disposed on and in contact with the substrate, disposed on the substrate via another component, or a part of the component is disposed on and in contact with the substrate and a part of the component is disposed on the substrate via another component.

A liquid crystal apparatus of the present exemplary embodiment will be described by taking, as an example, an active matrix liquid crystal apparatus including a Thin Film Transistor (TFT) as a switching element of a pixel. This liquid crystal apparatus can be used suitably as, for example, a liquid crystal light valve of a projector described below.

First Exemplary Embodiment

Figure 1:
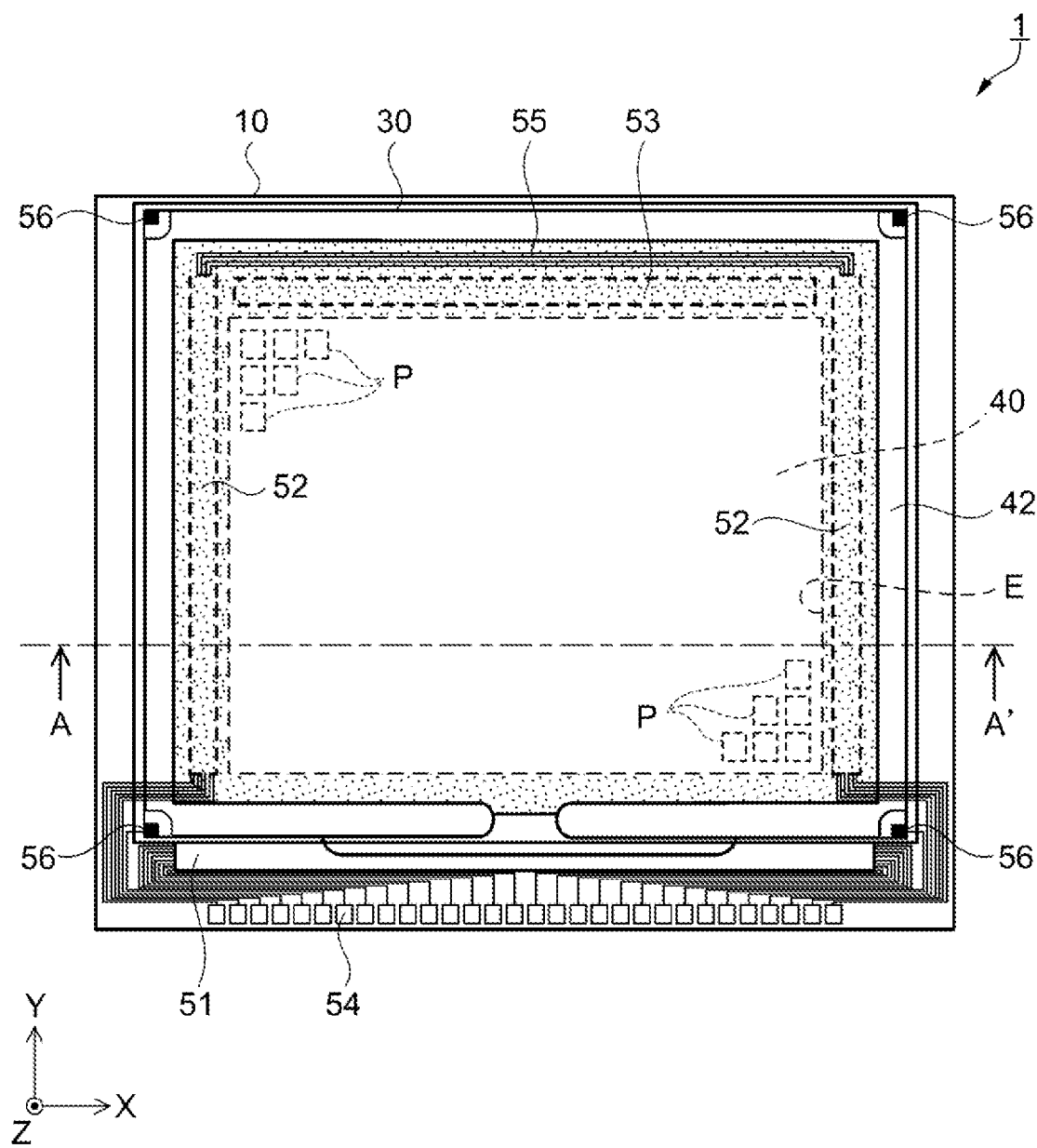
FIG. 1 is a schematic plan view illustrating a configuration of a liquid crystal apparatus.
Figure 2:
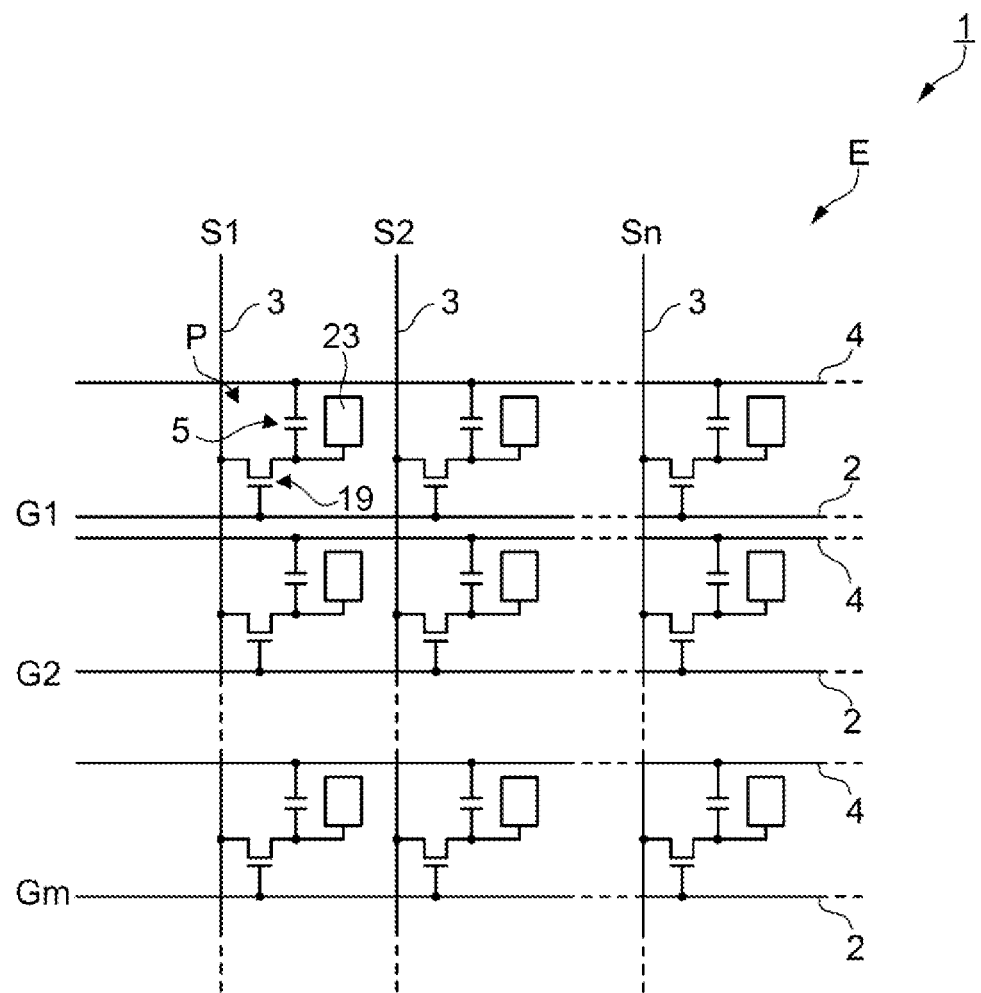
FIG. 2 is an equivalent circuit diagram illustrating an electrical configuration of the liquid crystal apparatus.
Figure 3:
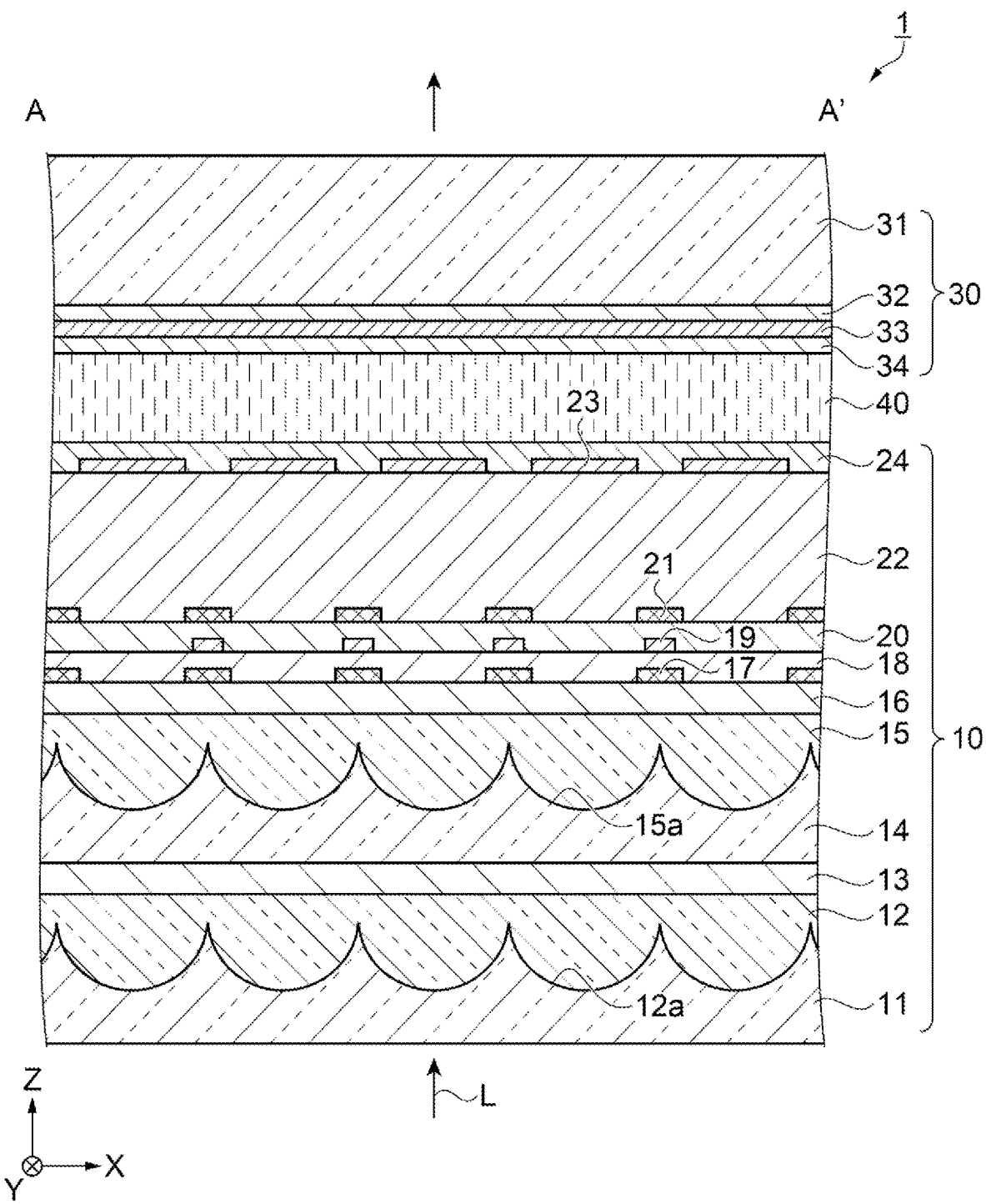
FIG. 3 is a schematic cross-sectional view taken along line A-A' of the liquid crystal apparatus illustrated in FIG. 1.

Next, a liquid crystal apparatus according to the present exemplary embodiment will be described with reference to FIGS. 1 to 3. FIG. 1 is a schematic plan view illustrating a configuration of the liquid crystal apparatus. FIG. 2 is an equivalent circuit diagram illustrating an electrical configuration of the liquid crystal apparatus. FIG. 3 is a schematic cross-sectional view taken along the line A-A' of the liquid crystal apparatus illustrated in FIG. 1.

First, as illustrated in FIG. 1, a liquid crystal apparatus 1 according to the present exemplary embodiment includes an element substrate 10 as a first substrate, a counter substrate 30 as a second substrate disposed facing the element substrate 10, a seal material 42, and a liquid crystal layer 40. The element substrate 10 is larger than the counter substrate 30, and both substrates are bonded together via the seal material 42 disposed in a frame shape along an edge portion of the counter substrate 30.

The liquid crystal layer 40 is configured by a liquid crystal having positive or negative dielectric anisotropy and encapsulated in a space surrounded by the element substrate 10, the counter substrate 30, and the seal material 42. As the seal material 42, for example, an adhesive such as a thermosetting or ultraviolet light curing epoxy resin is employed. A spacer (not illustrated) for maintaining a constant interval between the element substrate 10 and the counter substrate 30 is included in the seal material 42.

A light shielding layer provided to the element substrate 10 and a light shielding layer provided to the counter substrate 30 are disposed on an inner side of the seal material 42 arranged in a frame shape. The light shielding layer includes a peripheral edge portion having a frame shape, and is formed by, for example, a metal or a metal oxide having a light shielding property. The inner side of the light shielding layer having a frame shape is a display region E in which a plurality of pixels P are arranged. The pixels P have a substantially polygonal planar shape. The pixels P have, for example, a substantially rectangular shape and are arranged in a matrix shape.

The display region E is a region that substantially contributes to display in the liquid crystal apparatus 1. The light shielding layer provided to the element substrate 10 is provided in a lattice shape, for example, to partition the opening areas of the plurality of pixels P in a planar manner in the display region E. Note that the liquid crystal apparatus 1 may include a dummy region that is provided surrounding a periphery of the display region E and does not substantially contribute to display.

A data line driving circuit 51 and a plurality of external connection terminals 54 are provided to the element substrate 10 along a first side positioned on a lower side in FIG. 1. In addition, an inspection circuit 53 is provided on the display region E side of the seal material 42 along a second side facing the first side. Furthermore, a scanning line driving circuit 52 is provided on the inner side of the seal material 42 along each of the other two sides orthogonal to the first and second sides and facing each other.

On the display region E side of the seal material 42 of the second side provided with the inspection circuit 53, a plurality of lines of wiring 55 configured to connect the two scanning line driving circuits 52 are provided. The lines of wiring connected to the data line driving circuit 51 and the scanning line driving circuits 52 are coupled to the plurality of external connection terminals 54. In addition, corners of the counter substrate 30 are each provided with a vertical conduction portion 56 configured to establish electrical conduction between the element substrate 10 and the counter substrate 30. Note that the arrangement of the inspection circuit 53 is not limited to the above, and the inspection circuit 53 may be provided at a position along the inner side of the seal material 42 between the data line driving circuit 51 and the display region E.

In the following description, an axis along the first side provided with the data line driving circuit 51 is referred to as an X axis, and an axis along the two other sides orthogonal to the first side and facing each other is referred to as a Y axis. The X axis is the axis along the line A-A' in FIG. 1. Light shielding layers 17, 21 are provided in a lattice shape along the X axis and the Y axis. The opening areas of the pixels P are defined in a lattice shape by the light shielding layers 17, 21, and are arranged in a matrix shape along the X axis and the Y axis.

Furthermore, an axis orthogonal to the X axis and the Y axis and extending toward the front in FIG. 1 is referred to as a Z axis. Further, in the present specification, viewing from the normal direction of the surface of the liquid crystal apparatus 1 on the counter substrate 30 side is referred to as "plan view".

As illustrated in FIG. 2, in the display region E of the element substrate 10, scanning lines 2 and data lines 3 are formed to intersect each other, and the pixels P are provided correspondingly to the intersections of the scanning lines 2 and the data lines 3. A pixel electrode 23 and a TFT 19 serving as the switching element are provided in each of the pixels P.

A source electrode of the TFT 19 is electrically coupled to the data line 3 extending from the data line driving circuit 51. Image signals, that is, data signals S1, S2, . . . , Sn are line-sequentially supplied from the data line driving circuit 51 to the data lines 3. A gate electrode of the TFT 19 is a portion of the scanning line 2 extending from the scanning line driving circuit 52. Scanning signals G1, G2, . . . , Gm are line-sequentially supplied from the scanning line driving circuit 52 to the scanning lines 2. Note that a drain electrode of the TFT 19 is electrically coupled to the pixel electrode 23.

The image signals S1, S2, . . . , Sn are written to the pixel electrodes 23 via the data lines 3 at a predetermined timing by turning the TFT 19 on for a certain period of time. The image signals of a predetermined level thus written in the liquid crystal layer 40 via the pixel electrodes 23 are held for a certain period at a liquid crystal capacitor formed between the pixel electrodes 23 and a common electrode 33 provided to the counter substrate 30 and illustrated in FIG. 3.

Note that, to prevent the image signals S1, S2, . . . , Sn held from leaking, a storage capacitor 5 is formed between a capacitor line 4 formed along the scanning line 2 and the pixel electrode 23 and disposed in parallel with a liquid crystal capacitor. In this way, when a voltage signal is applied to the liquid crystal of each pixel P, an alignment state of the liquid crystal changes due to the applied voltage level. As a result, light incident on the liquid crystal layer 40 illustrated in FIG. 3 is modulated to enable gradation display.

The liquid crystal constituting the liquid crystal layer 40, an orientation and an order of molecular assembly are changed by a level of voltage to be applied and, accordingly, modulates the light and enables gradation display. For example, in a normally white mode, the transmittance for incident light decreases in accordance with the voltage applied in each pixel P. In a normally black mode, the transmittance for incident light increases in accordance with the voltage applied in each pixel P. Further, light having contrast in accordance with the image signal is emitted from the liquid crystal apparatus 1 as a whole.

As illustrated in FIG. 3, the liquid crystal apparatus 1 includes the element substrate 10, the counter substrate 30, and the liquid crystal layer 40 sandwiched between the element substrate 10 and the counter substrate 30. In the present exemplary embodiment, light L is incident from the element substrate 10 side, passes through the liquid crystal layer 40, and is emitted from the counter substrate 30 side.

The element substrate 10 includes a first base material 1, a first lens layer 12, a light transmitting layer 13, an intermediate layer 14, a second lens layer 15, a light transmitting layer 16, the light shielding layer 17, an insulating layer 18, the TFT 19, an insulating layer 20, the light shielding layer 21, an insulating layer 22, the pixel electrode 23, and an alignment film 24. The first lens layer 12 includes a plurality of first microlenses ML1. The second lens layer 15 includes a plurality of first microlenses ML2. The liquid crystal apparatus 1 of the present exemplary embodiment includes a two-stage microlens of the first microlens ML1 and the second microlens ML2.

The first base material 11 is made of a material having light transmittance such as glass or quartz, for example. A plurality of recessed portions 12a are provided to the first base material 11. The recessed portion 12a is provided on a per pixel P basis. The cross-sectional shape of the recessed portion 12a is a curved surface such as a semicircle or a semi-ellipse, for example. The recessed portion 12a constitutes a lens surface of the first microlens ML1.

The first lens layer 12 is formed to fill the recessed portions 12a. The first lens layer 12 is made of an inorganic material having light transmittance and having a refractive index different from that of the first base material 11. In the present exemplary embodiment, the refractive index of the first lens layer 12 is greater than the refractive index of the first base material 11 and greater than the refractive index of the second lens layer 15. Examples of such inorganic materials include SiON and the like.

The first microlens ML1 is formed by embedding the recessed portion 12a with the material that forms the first lens layer 12. That is, of the first lens layer 12, a portion filling the recessed portion 12a and having a convex shape protruding toward the side on which the light L is incident is the first microlens ML1. The first microlens ML1 is disposed on a per pixel P basis.

A light transmitting layer 13 is formed to cover the first lens layer 12. The light transmitting layer 13 has light transmittance, and is made of an inorganic material such as $SiO_2$, for example, having substantially the same refractive index as the first lens layer 12. The light transmitting layer 13 serves to protect the first lens layer 12 and to bring a distance from the first microlens ML1 to the second microlens ML2 to a desired value. A layer thickness of the light transmitting layer 13 is set as appropriate based on optical conditions such as a focal length of the first microlens ML1 corresponding to a wavelength of light.

The intermediate layer 14 is formed to cover the light transmitting layer 13. The intermediate layer 14 has light transmittance, and is formed from an inorganic material such as $SiO_2$, for example, having substantially the same refractive index as the light transmitting layer 13.

A plurality of recessed portions 15a are provided to the intermediate layer 14. The recessed portion 15a is provided on a per pixel P basis. The cross-sectional shape of the recessed portion 15a is a curved surface such as a semicircle or a semi-ellipse, for example. The recessed portion 15a constitutes a lens surface of the second microlens ML2.

The second lens layer 15 is formed to fill the recessed portions 15a. The second lens layer 15 has light transmittance and has a smaller refractive index than the refractive index of the first lens layer 12. Examples of such inorganic materials include SiON and the like.

The second microlens ML2 is formed by embedding the recessed portion 15a with the material that forms the second lens layer 15. That is, of the second lens layer 15, a portion filling the recessed portion 15a and having a convex shape protruding toward the side on which the light L is incident is the second microlens ML2. The second microlens ML2 is disposed on a per pixel P basis.

Given that lens power is the ability of a microlens to bend light (the reciprocal of focal length), the relationship between the lens power of the first microlens ML1 and the lens power of the second microlens ML2 may be that the lens power of the second microlens is the same as the lens power of the first microlens ML1 disposed on the incident side of the light L, or the lens power of the first microlens ML1 is greater than the lens power ML2 of the second microlens. Note that lens power expresses the degree of ability of the microlens to bend light, and depends on the refractive index and the angle of the lens.

In addition, in the present exemplary embodiment, the first microlens ML1 having a convex shape, that is, a convex lens, and the second microlens ML2 having a convex shape, that is, a convex lens, protruding toward the incident side of the light L, are disposed.

The light transmitting layer 16 is formed to cover the second lens layer 15. The light transmitting layer 16 has light transmittance, and is made of an inorganic material such as $SiO_2$, for example, having substantially the same refractive index as the second lens layer 15. The light transmitting layer 16 serves to protect the second lens layer 15 and bring the distance from the second microlens ML2 to the liquid crystal layer 40 to a desired value. A layer thickness of the light transmitting layer 16 is set as appropriate based on optical conditions such as a focal length of the second microlens ML2 corresponding to a wavelength of light.

The light shielding layer 17 is provided on the light transmitting layer 16. The light shielding layer 17 is formed in a lattice shape to overlap with the light shielding layer 21 of the upper layer in plan view. The light shielding layer 17 and the light shielding layer 21 are formed, for example, of a metal, a metal compound, or the like. The light shielding layer 17 and the light shielding layer 21 are disposed to sandwich the TFT 19 in a thickness direction (Z axis) of the element substrate 10. The light shielding layer 17 overlaps at least a channel area of the TFT 19 in plan view.

The insulating layer 18 is provided to cover the light transmitting layer 16 and the light shielding layer 17. The insulating layer 18 is made of an inorganic material such as $SiO_2$, for example.

The TFT 19 is provided on the insulating layer 18 and is disposed in a region overlapping in plan view with the light shielding layer 17 and the light shielding layer 21. The TFT 19 is a switching element that drives the pixel electrode 23. The TFT 19 includes a semiconductor layer, a gate electrode, a source electrode, and a drain electrode (not illustrated). A source area, a channel area, and a drain area are formed in the semiconductor layer. A lightly doped drain (LDD) area may be formed at the channel area and the source area, or at an interface between the channel area and the drain area.

The gate electrode is formed in a region overlapping, via a portion of the insulating layer 20, that is, via the gate insulating film, the channel area of the semiconductor layer in plan view in the element substrate 10. Although not illustrated, the gate electrode is electrically coupled, via a contact hole, to a scanning line disposed on the lower layer side, and the TFT 19 is turned on and off by a scanning signal being applied.

The insulating layer 20 is provided to cover the insulating layer 18 and the TFT 19. The insulating layer 20 is made of an inorganic material such as $SiO_2$, for example. The insulating layer 20 includes a gate insulating film that insulates an area between the semiconductor layer and the gate electrode of the TFT 19. The insulating layer 20 mitigates the surface irregularities caused by the TFT 19.

The light shielding layer 21 described above is provided on the insulating layer 20. Then, an insulating layer 22 made from an inorganic material such as $SiO_2$ is provided to cover the insulating layer 20 and the light shielding layer 21.

The incidence of light on the TFT 19 from the first base material 11 side is suppressed by the light shielding layer 17, and the incidence of light on the TFT 19 from the liquid crystal layer 40 is suppressed by the light shielding layer 21, making it possible to suppress an increase in optical leakage current at the TFT 19 and a malfunction caused by light. The region within the opening portion surrounded by the light shielding layer 17 and the region within the opening portion surrounded by the light shielding layer 21 overlap in plan view, and is an opening area in the region of the pixel P through which light is transmitted.

The pixel electrode 23 is provided on the insulating layer 22 on a per pixel P basis. The pixel electrode 23 is disposed in a region overlapping in plan view with the opening portion of the pixel P. The pixel electrode 23 is made from a transparent conductive film such as Indium Tin Oxide (ITO) or Indium Ainc Oxide (IZO), for example. The alignment film 24 is provided covering the pixel electrode 23. The liquid crystal layer 40 is encapsulated between the alignment film 24 on the element substrate 10 side and an alignment film 34 on the counter substrate 30 side. Note that the pixel electrode 23 and the TFT 19 are coupled by a tungsten plug (not illustrated). The coupling between the pixel electrode 23 and the TFT 19 may be configured by the coupling of a relay electrode of one or a plurality of layers.

The counter substrate 30 includes a second base material 31, an insulating layer 32, the common electrode 33, and the alignment film 34. The second base material 31 is made of a material having light transmittance such as glass or quartz, for example.

The insulating layer 32 is formed on an entire surface of the second base material 31. The insulating layer 32 is formed from an inorganic material such as $SiO_2$, for example. The common electrode 33 is provided covering the insulating layer 32 and is formed across the plurality of pixels P. Further, the common electrode 23 is made from a transparent conductive film such as ITO or IZO, for example. The alignment film 34 is provided covering the common electrode 33.

Not that, although not illustrated, an electrode, lines of wiring, and a relay electrode for supplying electrical signals to the TFT 19, a capacitor electrode constituting the storage capacitor 5 illustrated in FIG. 2, and the like are provided in a region overlapping the light shielding layer 17 and the light shielding layer 21 in plan view.

In the liquid crystal apparatus 1 according to the present exemplary embodiment, the light L emitted from a light source or the like is incident from the element substrate 10 side including the first microlens ML1 and the second microlens ML2, and emitted from the counter substrate 30 side.

In this manner, by disposing the first microlens ML1 and the second microlens ML2 on the element substrate 10 and making the lens power of the first microlens ML1 disposed on the incident side of the light L greater than that of the second microlens ML2, it is possible to improve light utilization efficiency. Furthermore, because two microlenses are disposed on the element substrate 10, the occurrence of positional deviation when the element substrate 10 and the counter substrate 30 are bonded can be suppressed and, as a result, generation of diffraction light can be suppressed and contrast can be improved.

In addition, the first microlens ML1 and the second microlens ML2 are microlenses having a convex shape protruding on the incident side of the light L, and thus the same formation method can be used and positional deviation of the microlenses can be suppressed.

In addition, because two microlenses are disposed below the TFT 19, that is, on the side opposite from the liquid crystal layer 40, the light L can be emitted to the counter substrate 30 without being blocked by the TFT 19, lines of wiring, or the like, and light utilization efficiency can be improved.

Electronic Device

Figure 4:
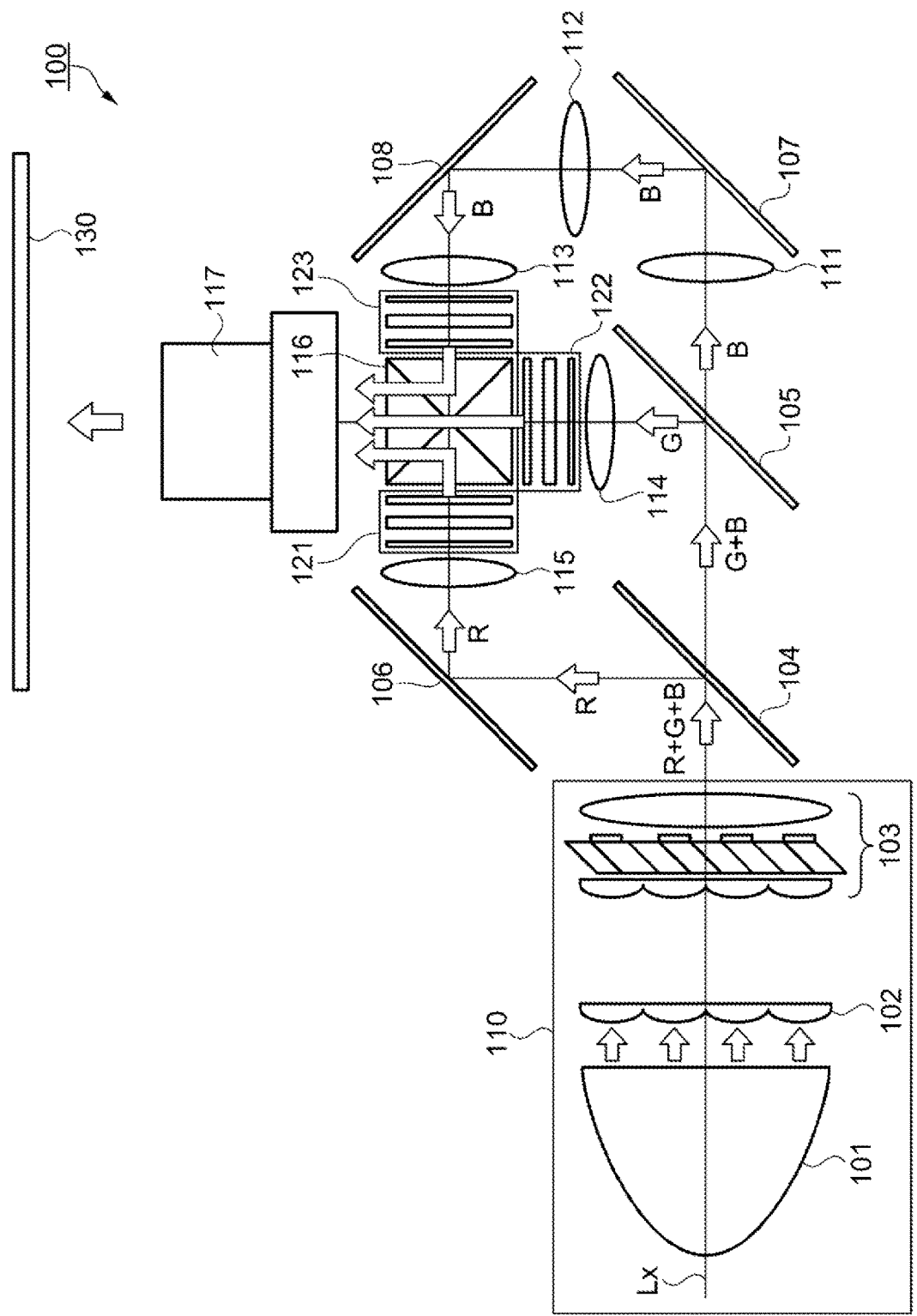
FIG. 4 is a schematic view illustrating a configuration of a projector.

Next, a configuration of a projector as an electronic device according to the present exemplary embodiment will be described. FIG. 4 is a schematic view illustrating the configuration of the projector. Hereinafter, the configuration of the projector will be described with reference to FIG. 4.

As illustrated in FIG. 4, a projector 100 includes a polarization illumination apparatus 110, two dichroic mirrors 104, 105, three reflective mirrors 106, 107, 108, five relay lenses 111, 112, 113, 114, 115, three liquid crystal light valves 121, 122, 123, a cross dichroic prism 116, and a projection lens 117.

The polarization illumination apparatus 110 includes a lamp unit 101 as a light source including a white light source such as an extra-high pressure mercury lamp or a halogen lamp, an integrator lens 102, and a polarization conversion element 103. The lamp unit 101, the integrator lens 102, and the polarization conversion element 103 are disposed along a system optical axis Lx.

The dichroic mirror 104 reflects red light (R) of a polarized light flux emitted from the polarization illumination device 110 and transmits green light (G) and blue light (B). The other dichroic mirror 105 reflects the green light (G) transmitted by the dichroic mirror 104 and transmits the blue light (B).

The red light (R) reflected by the dichroic mirror 104 is reflected by the reflection mirror 106 and subsequently incident on the liquid crystal light valve 121 via the relay lens 115. The green light (G) reflected by the dichroic mirror 105 is incident on the liquid crystal light valve 122 via the relay lens 114. The blue light (B) transmitted by the dichroic mirror 105 is incident on the liquid crystal light valve 123 via a light guide system including the three relay lenses 111, 112, 113 and the two reflection mirrors 107, 108.

The transmissive liquid crystal light valves 121, 122, 123 serving as light conversion elements are each disposed facing an incident surface of each type of color light of the cross dichroic prism 116. The color light incident on the liquid crystal light valves 121, 122, 123 is modulated based on video information (video signal) and exits toward the cross dichroic prism 116.

In the cross dichroic prism 116, four right-angle prisms are bonded together, and on inner surfaces of the prisms, a dielectric multilayer film configured to reflect the red light and a dielectric multilayer film configured to reflect the blue light are formed in a cross shape. The three types of color light are synthesized by these dielectric multilayer films, and light representing a color image is synthesized. The synthesized light is projected on a screen 130 by the projection lens 117 being the projection optical system, and the image is expanded and displayed.

The liquid crystal light valve 121 is disposed with a gap between a pair of light-polarization elements disposed in a crossed-Nicols on the incident side and the emission side of the color light. The same applies to the other liquid crystal light valves 122, 123. The liquid crystal light valves 121, 122, 123 are valves to which the liquid crystal apparatus 1 according to the first exemplary embodiment is applied.

As described above, according to the liquid crystal apparatus 1 and the projector 100 of the first exemplary embodiment, the following effects can be obtained.

(1) According to the liquid crystal apparatus 1 of the first exemplary embodiment, by disposing the first microlens ML1 and the second microlens ML2 on the element substrate 10 and making the lens power of the first microlens ML1 disposed on the incident side of the light L greater than or equal to the lens power of the second microlens ML2, it is possible to improve light utilization efficiency. Furthermore, because two microlenses are disposed on the element substrate 10, the occurrence of positional deviation when the element substrate 10 and the counter substrate 30 are bonded can be suppressed and, as a result, generation of diffraction light can be suppressed and contrast can be improved.

(2) According to the projector 100 of the first exemplary embodiment, it is possible to provide the projector 100 capable of improving display quality such as contrast.

Second Exemplary Embodiment

Figure 5:
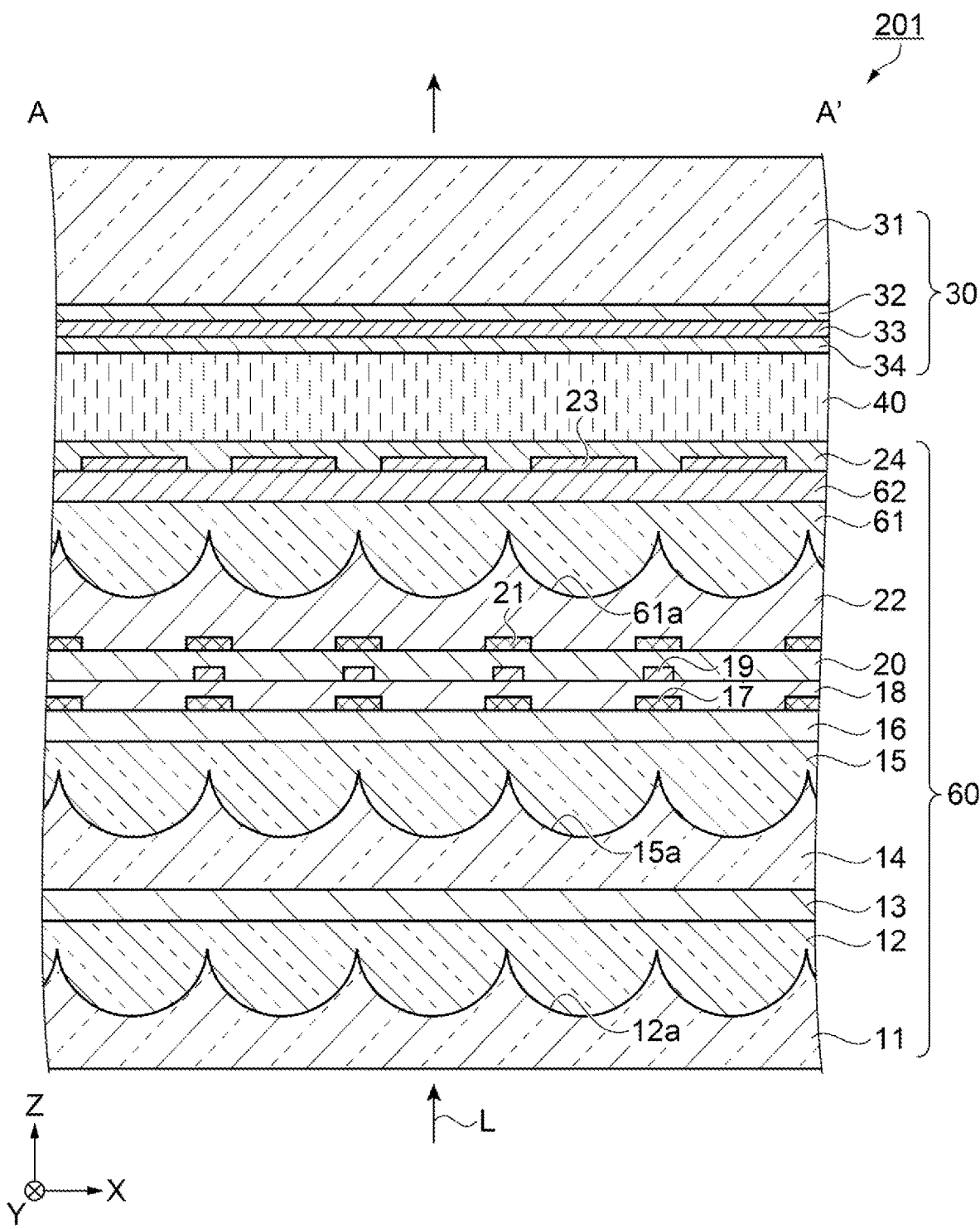
FIG. 5 is a schematic cross-sectional view taken along line the A-A' of the liquid crystal apparatus illustrated in FIG. 1.

FIG. 5 is a schematic cross-sectional view illustrating a configuration of a liquid crystal apparatus according to a second exemplary embodiment. The configuration of the liquid crystal apparatus of the second exemplary embodiment will be described below with reference to FIG. 5.

While in the liquid crystal apparatus 1 of the first exemplary embodiment, the two microlenses of the first microlens ML1 and the second microlens ML2 are disposed on the element substrate 10, a liquid crystal apparatus 201 of the second exemplary embodiment differs in that three microlenses of the first microlens ML1, the second microlens ML2, and a third microlens ML3 are disposed on an element substrate 60. The other portions are substantially the same as those of the first exemplary embodiment and, therefore, in the second exemplary embodiment, portions different from those of the first exemplary embodiment will be described in detail, and descriptions of other overlapping portions will be omitted as appropriate.

As illustrated in FIG. 5, in the liquid crystal apparatus 201 of the second exemplary embodiment, a recessed portion 61a is formed in the insulating layer 22 formed from an inorganic material disposed in an upper layer of the TFT 19. A plurality of the recessed portions 61a are provided in the insulating layer 22, as described above. The recessed portion 61a is provided on a per pixel P basis. The cross-sectional shape of the recessed portion 61a is a curved surface such as a semicircle or a semi-ellipse, for example. The recessed portion 61a constitutes the lens surface of the third microlens ML3.

A third lens layer 61 is formed to fill the recessed portions 61a. The third lens layer 61 has light transmittance and has a smaller refractive index than the refractive index of the second lens layer 15. Examples of such inorganic materials include SiON and the like.

The third microlens ML3 is formed by embedding the recessed portion 61a with the material that forms the third lens layer 61. That is, of the third lens layer 61, a portion filling the recessed portion 61a and having a convex shape protruding toward the side on which the light L is incident is the third microlens ML3. The third microlens ML3 is disposed on a per pixel P basis. In other words, the third microlens ML3 including the recessed portion 61a is provided between the pixel electrodes 23 and the TFT 19. Note that the pixel electrodes 23 and the TFT 19 are coupled by a tungsten plug (not illustrated). The coupling between the pixel electrode 23 and the TFT 19 may be configured by the coupling of a relay electrode of one or a plurality of layers.

In the present exemplary embodiment, the light L is incident from the element substrate 60 side including the first microlens ML1, the second microlens ML2, and the third microlens ML3, and emitted from the counter substrate 30 side.

Thus, the third microlens ML3 of the present exemplary embodiment is convex, that is, a convex lens, when viewed from the incident side of the light L. That is, the first microlens ML1, the second microlens ML2, and the third microlens ML3 are all microlenses having a convex shape protruding on the incident side of the light L.

Note that the relationship between the lens powers of each of the microlenses may satisfy the relationship of "the first microlens ML1 the second microlens ML2 the third microlens ML3", that is, the lens power of the first microlens ML1 may be greater than or equal to the lens power of the second microlens ML2, and the lens power of the second microlens ML2 may be greater than or equal to the lens power of the third microlens ML3. A light transmitting layer 62, for example, is formed on the insulating layer 22.

The light transmitting layer 62 is formed to cover the third lens layer 61. The light transmitting layer 62 has light transmittance, and is made of an inorganic material such as $SiO_2$, for example, having substantially the same refractive index as the third lens layer 61. The light transmitting layer 62 serves to protect the third lens layer 61 and bring the distance from the third microlens ML3 to the liquid crystal layer 40 to a desired value. A layer thickness of the light transmitting layer 62 is set as appropriate based on optical conditions such as a focal length of the third microlens ML3 corresponding to a wavelength of light.

With the three microlenses ML1, ML2, ML3 thus disposed on the element substrate 60, the following effects can be obtained. The first microlens ML1 and the second microlens ML2 facilitate the efficient collection of light in the opening area of the display region E, making it possible for light beams to be collimated by the third microlens ML3 disposed between the TFT 19 and the pixel electrode 23, and thus improve light utilization efficiency.

Additionally, with the three microlenses ML1, ML2, ML3 provided to the element substrate 60, positional deviation of the pixel electrode 23, the light shielding layers 17, 21, and the like can be suppressed. Furthermore, with a microlens not disposed on the counter substrate 30, displacement when the element substrate 60 and the counter substrate 30 are bonded can be eliminated. As a result, light utilization efficiency can be improved, that is, brightness can be enhanced, and the contrast ratio can be improved.

In addition, the first microlens ML1, the second microlens ML2, and the third microlens ML3 are all uniform microlenses having a convex shape protruding on the incident side of the light L, and thus the formation method of the microlenses ML1, ML2, ML3 can be made the same, making it possible to streamline the formation method and suppress positional deviation of the microlenses.

In addition, by reducing the lens power of the third microlens ML3 compared to those of the first microlens ML1 and the second microlens ML2, it is possible to suppress vignetting by the projection lens as well as a reduction in the contrast ratio.

As described above, according to the liquid crystal apparatus 201 of the second exemplary embodiment, the following effects can be obtained.

(3) According to the second exemplary embodiment, the three microlenses of the first microlens ML1, the second microlens ML2, and the third microlens ML3 are provided to the element substrate 60, and thus light can be efficiently collected in three stages, and brightness can be improved. Further, because the three microlenses ML1, ML2, ML3 are formed at the element substrate 60 including the pixel electrode 23 and the TFT 19, the occurrence of displacement when the element substrate 60 and the counter substrate 30 are bonded can be suppressed and, as a result, generation of diffraction light can be suppressed and the contrast ratio can be improved.

Modified Examples

Further, the exemplary embodiments described above may be modified as follows.

While, in the first exemplary embodiment described above, the first microlens ML1 and the second microlens ML2 are formed from microlenses having a convex shape protruding toward the incident side of the light L, the present disclosure is not limited thereto, and the configuration may be a combination with a microlens having a concave shape protruding toward the emission side of the light L, or may be only microlenses having a concave shape. In addition, similar to the second exemplary embodiment, the configuration may be a combination with a microlens having a concave shape or may be only microlenses having a concave shape. Note that the lens power relationship may be the same as that of the exemplary embodiment described above.

While, in the exemplary embodiments described above, the two microlenses ML1, ML2 are disposed below the TFT 19 (opposite to the liquid crystal layer 40), the present disclosure is not limited thereto, and two or more microlenses may be disposed.

While, in the exemplary embodiment described above, the center of the microlens and the center of the pixel are the same, the present disclosure is not limited thereto, and the center of the microlens and the center of the pixel may be different from each other, or the center position of the second microlens ML2 may shift gradually from the center of the display region E toward the outer side of the display region E. In addition, the amount of shift may be varied for each RGB.

Contents derived from the exemplary embodiments will be described below.

A liquid crystal apparatus includes a first substrate disposed on an incident side of light and including a pixel electrode and a switching element, a second substrate disposed facing the first substrate and disposed on an emission side of the light, and a liquid crystal layer disposed between the first substrate and the second substrate. The first substrate includes a first microlens disposed correspondingly to the pixel electrode and disposed further toward the incident side of the light than the pixel electrode, and a second microlens disposed correspondingly to the pixel electrode and disposed between the pixel electrode and the first microlens. A relationship between a lens power of the first microlens and a lens power of the second microlens is that the lens power of the first microlens is greater than or equal to the lens power of the second microlens.

According to this configuration, by disposing the first microlens and the second microlens on the first substrate and making the lens power of the first microlens disposed on the incident side of the light greater than or equal to the lens power of the second microlens, it is possible to improve light utilization efficiency. Furthermore, because two microlenses are disposed on the first substrate, the occurrence of positional deviation when the first substrate and the second substrate are bonded can be suppressed and, as a result, generation of diffraction light can be suppressed and contrast can be improved.

In the liquid crystal apparatus described above, the first microlens and the second microlens may be convex lenses protruding toward the incident side of the light.

According to this configuration, because two convex lenses protruding with the orientations of the microlenses in the same direction are provided, it is possible to produce and efficiently form the convex lenses using the same manufacturing method.

In the liquid crystal apparatus described above, the first microlens and the second microlens may be disposed on a side opposite from the liquid crystal layer relative to the switching element.

According to this configuration, because two microlenses are formed on the side opposite from the liquid crystal layer 40 relative to the switching element, the light can be emitted to the second substrate without being blocked by the switching element, making it possible to improve light utilization efficiency.

A liquid crystal apparatus includes a first substrate including a pixel electrode and a switching element, a second substrate disposed facing the first substrate, and a liquid crystal layer disposed between the first substrate and the second substrate. The first substrate includes a first microlens, a second microlens, and a third microlens corresponding to the pixel electrode.

According to this configuration, because three microlenses are provided on the first substrate including the switching element, brightness can be improved. Furthermore, because the three microlenses are formed at the same first substrate including the switching element, the occurrence of displacement when the first substrate and the second substrate are bonded can be suppressed and contrast can be improved.

In the liquid crystal apparatus described above, the first substrate may be disposed on an incident side of light, the second substrate may be disposed on an emission side of the light, and the first microlens, the second microlens, and the third microlens may be convex lenses protruding toward the incident side of the light.

According to this configuration, because three microlenses, which are convex lenses, are disposed on the first substrate, which is on the incident side of the light, light can be collected without being blocked by the switching element or the like, making it possible to improve light utilization efficiency.

A liquid crystal apparatus includes a first substrate disposed on an incident side of light and including a pixel electrode and a switching element, a second substrate disposed facing the first substrate and disposed on an emission side of the light, and a liquid crystal layer disposed between the first substrate and the second substrate. The first substrate includes a first microlens disposed correspondingly to the pixel electrode and disposed further toward the incident side of the light than the pixel electrode, a second microlens disposed correspondingly to the pixel electrode and disposed between the pixel electrode and the first microlens, and a third microlens disposed correspondingly to the pixel electrode and disposed between the liquid crystal layer and the pixel electrode. A relationship between a lens power of the first microlens, a lens power of the second microlens, and a lens power of the third microlens is that the lens power of the first microlens is greater than or equal to the lens power of the second microlens, and the lens power of the second microlens is greater than or equal to the lens power of the third microlens.

According to this configuration, by disposing the first microlens, the second microlens, and the third microlens on the first substrate and establishing such a lens power relationship as described above, it is possible to improve light utilization efficiency. Furthermore, because three microlenses are disposed on the first substrate, the occurrence of positional deviation when the first substrate and the second substrate are bonded can be suppressed and, as a result, generation of diffraction light can be suppressed and contrast can be improved.

In the liquid crystal apparatus described above, the first microlens and the second microlens may be convex lenses protruding toward the incident side of the light.

According to this configuration, because three convex lenses protruding with the orientations of the microlenses all in the same direction are provided, it is possible to produce the convex lenses using the same manufacturing method, and suppress the occurrence of positional deviation.

An electronic device includes the liquid crystal apparatus described above.

According to this configuration, it is possible to provide an electronic device capable of improving display quality such as contrast.

What is claimed is:

1. A liquid crystal apparatus comprising:
a base material;
a pixel electrode;
a switching element disposed between the base material and the pixel electrode;
a first microlens disposed between the base material and the switching element;
a second microlens disposed between the first microlens and the switching element; and
a third microlens disposed between the switching element and the pixel electrode, such that the first microlens is disposed further toward an incident side of light than both the second microlens and the third microlens, and the second microlens is disposed further toward the incident side of the light than the third microlens.

2. A liquid crystal apparatus comprising:
a first substrate;
a second substrate disposed facing the first substrate; and
a liquid crystal layer disposed between the first substrate and the second substrate, wherein
the first substrate includes
a base material,
a pixel electrode disposed in the base material,
a switching element disposed between the base material and the pixel electrode,
a first microlens disposed between the base material and the switching element,
a second microlens disposed between the first microlens and the switching element, and
a third microlens disposed between the switching element and the pixel electrode, such that the first microlens is disposed further toward an incident side of light than both the second microlens and the third microlens, and the second microlens is disposed further toward the incident side of the light than the third microlens,
the first substrate is disposed further toward the incident side of the light than the second substrate, and
a relationship between a lens power of the first microlens, a lens power of the second microlens, and a lens power of the third microlens is that the lens power of the first microlens is greater than or equal to the lens power of the second microlens, and the lens power of the second microlens is greater than or equal to the lens power of the third microlens.

3. The liquid crystal apparatus according to claim 2, wherein the first microlens, the second microlens, and the third microlens are convex lenses protruding toward the incident side of the light.

4. An electronic device comprising the liquid crystal apparatus according to claim 1.

5. An electronic device comprising the liquid crystal apparatus according to claim 2.

6. The liquid crystal apparatus according to claim 1, wherein:
the first microlens, the second microlens, and the third microlens are convex lenses protruding toward the incident side of the light; and
the first microlens and the second microlens are provided on a same side of the light transmitting layer and the third microlens is provided on an opposite side of the light transmitting layer.

7. The liquid crystal apparatus according to claim 1, wherein:
the first microlens, the second microlens, and the third microlens are convex lenses protruding toward the incident side of the light; and
the first microlens and the second microlens are provided on a same side of the light transmitting layer and the third microlens is provided on an opposite side of the light transmitting layer.

* * * * *